United States Patent [19]
Berger et al.

[11] Patent Number: 5,408,284
[45] Date of Patent: Apr. 18, 1995

[54] REMOTE-CONTROLLED SLIDE PROJECTOR

[75] Inventors: Stefan Berger, Markgroningen; Jurgen Horz, Kongen; Rainer Schulte, Remseck, all of Germany

[73] Assignee: Eastman Kodak Company, Rochester, N.Y.

[21] Appl. No.: 1,991

[22] Filed: Jan. 8, 1993

[30] Foreign Application Priority Data

Jan. 17, 1992 [DE] Germany .............. 42 01 176.0

[51] Int. Cl.⁶ .............................................. G03B 21/00
[52] U.S. Cl. ............................... 353/103; 353/122
[58] Field of Search ............ 353/86, 103, 122, 57, 353/59

[56] References Cited

U.S. PATENT DOCUMENTS

| | | | |
|---|---|---|---|
| 3,675,226 | 7/1972 | Long | 353/57 |
| 3,887,277 | 6/1975 | Tepper | 353/103 |
| 3,922,081 | 11/1975 | Uchidoi et al. | 353/86 |
| 3,958,875 | 5/1976 | Bowry et al. | 353/86 |
| 4,420,232 | 12/1983 | Mischenko | 353/103 |
| 4,432,618 | 2/1984 | Parker et al. | 353/103 |
| 4,440,478 | 4/1984 | Mischenko et al. | 353/103 |

Primary Examiner—Diego F. F. Gutierrez
Assistant Examiner—William C. Dowling
Attorney, Agent, or Firm—Peter J. Bilinski

[57] ABSTRACT

A remote-controlled slide projector is proposed in which for interrupting a slide presentation the projection lamp and the blower can be de-energized by a standby command of the remote control device. To continue the slide presentation, blower and projection lamp can be re-energized by another command via the remote control device. In the standby mode, the electronic control circuit of the projector is continued to be supplied with power.

8 Claims, 1 Drawing Sheet

REMOTE-CONTROLLED SLIDE PROJECTOR

FIELD OF THE INVENTION

The invention relates to a slide projector comprising in a known manner among others a transformer, a rectifier, a projection lamp, a blower and a control circuit, the latter being supplied with d. c. voltage from a rectifier following the transformer and controlling the projector functions such as slide change, tray advancement, light shutter, focussing, etc.

BACKGROUND INFORMATION

Slide projectors of this type are frequently used in slide presentations, the lecturer controlling the projector functions by means of a remote control device which may be connected to the projector via a cable. Cable-less remote control devices which include an IC transmitter are however also known, an IR receiver being arranged on the projector and transmission of the control signals being effected optically in the IR range. The various control signals are all encoded accordingly and evaluated, i.e. decoded, in the projector and associated with the respective functions.

During such presentations it may occur that the lecturer wishes to interrupt the performance to give additional explanations on a blackboard or show some objects. As in most cases the slide projector is placed in the back of the room and the lecturer stands in front of the audience near the screen, a second person would have to switch the projector off and, when the slide presentation is to be continued, on again. This may be quite disruptive, in particular if still a third person is desired to turn the room light on and off.

As a result, it would be desirable that the lecturer himself can switch on and off the projector as required by using his remote control device.

SUMMARY OF THE INVENTION

It is the object of the present invention to provide a circuit arrangement by means of which a slide projector can be switched on and off via its remote control device.

The above object is attained in that a circuit arrangement for a remote-controlled slide projector according to claim 1 is provided, whereby only the projection lamp and/or the blower is switched on and off while the power supply energizing the control circuit and the IR receiver remains operative.

BRIEF DESCRIPTION OF THE DRAWINGS

The invention will now be described in detail with reference to an embodiment shown in the drawing.

DESCRIPTION OF THE PREFERRED EMBODIMENT

Figure 1:
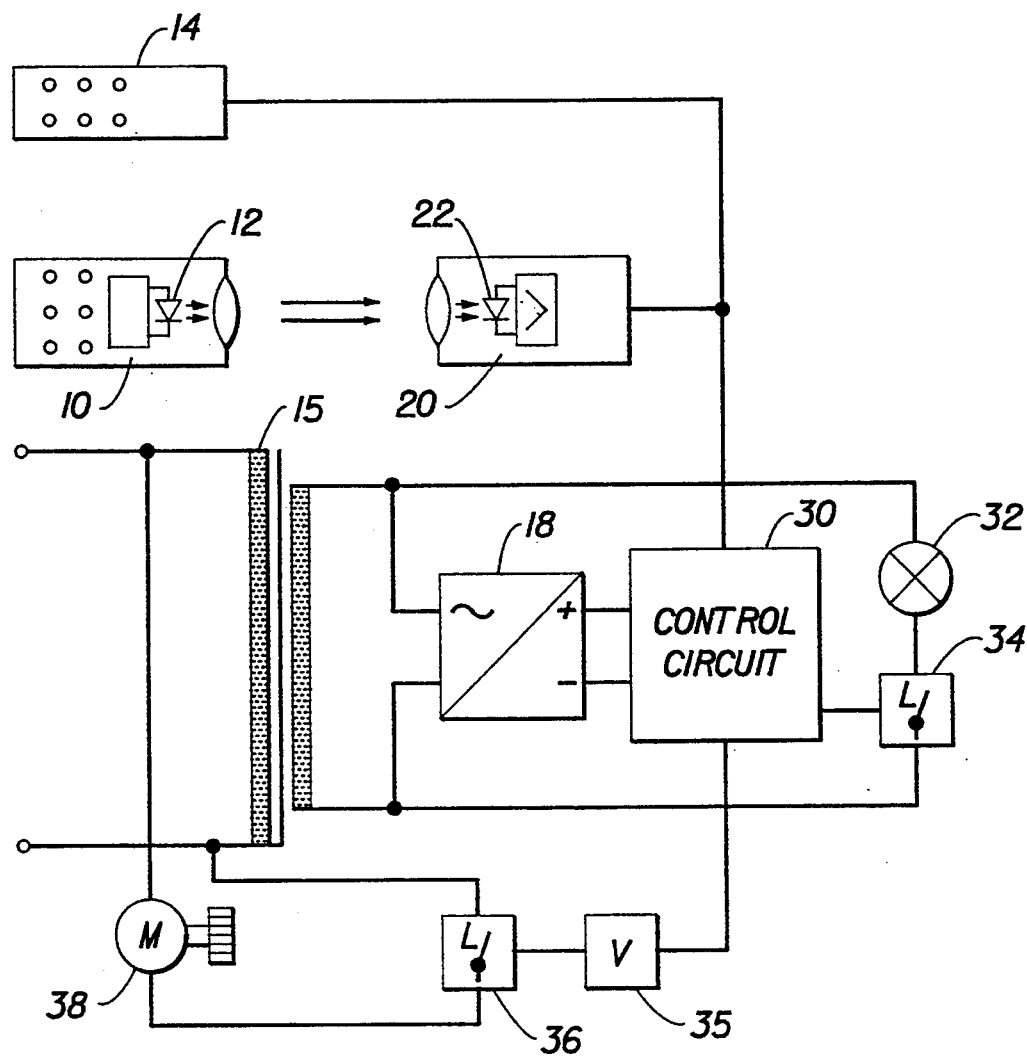
FIG. 1 shows the circuit arrangement according to the invention, in which only components of the circuit are illustrated that are essential for the invention; also shown is the use (optional) of a cable type remote control and of an IR remote control.
Figure 2:
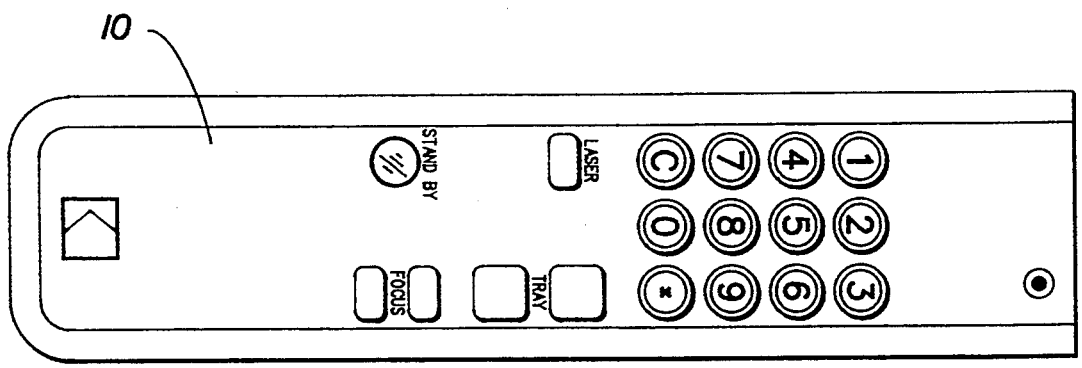
FIG. 2 shows an IR remote control device according to the invention.

As shown in FIG. 1, the projection lamp 32 is connected to the secondary of the transformer 15 via the switch 34, the same way as rectifier 18 supplying the control circuit 30, the delay circuit 35, the IR receiver as well as other circuits with d. c. voltage. Transformer 15 may also be an autotransformer or a transformer of a switching power unit. Via switch 36 the blower 38 is connected to the primary side of the transformer 15 directly to the power line. Instead, the blower could of course also be connected to the secondary of the transformer or to the d. c. output of rectifier 18.

If the complete projector would be de-energized, i.e. cut from the power line, the d. c. power supply for the control circuit and the remote control receiver would also go off so that the remote control device would not operate anymore. In this case, the circuit sections essential for the remote control device would have to be supplied with energy by means of a battery for re-activating the projector and the remote control.

As the provision of a battery however involves a few disadvantages, e.g. space required, exchangeability, reliability and additional costs, in the case of the present invention the solution was preferred which switches the projector to a so-called "stand-by mode" in which only the projection lamp and, if required, the blower are de-energized, whereas the control circuit and the remote control device remain operative.

The remote control may be designed as a remote control connected to the projector via cable, or as a cable-less remote control, e.g. an IR remote control, in which the control panel 10 includes one or several infrared LED's 12 and the receiver unit 20 comprises an infrared sensor 22. The IR receiver unit 20 and/or the cable type remote control 14 are connected to the control circuit 30 which may include a microprocessor and which decodes the remote control signals and associates them with the individual projector functions, such as slide change, tray advance forward/back, focussing, tray zero position, standby mode, etc.

In the standby mode, the projection lamp 32 is de-energized by the control circuit 30 via the switch 34, and the blower 38 can additionally be turned off via the switch 36. Switch 36 could of course be eliminated so that after switching off the projector lamp 32 the blower 38 continues to operate in order to more quickly cool down the projector. But as the blower noise might be felt nuisible, a delay circuit 35 can be provided by means of which the blower 38 is turned off only several seconds after de-energization of the projection lamp 32 so that the projector can adequately cool down before the blower is switched off. In this case, the delay circuit 35 can also be included in the control circuit 30 or the time delay can be programmed by the microprocessor contained in the control circuit 30.

The switches 34 and 36 may consist of relay contacts, but they may preferably be designed as semiconductor switches having triacs or thyristors or suchlike.

The projector is brought into standby operation by a special standby command of the remote control device and reset to normal operation by another standby signal or by a separate resetting signal. In this operating mode, the remaining remote-controlled functions of the projector should be locked in standby operation in order to guarantee that during this mode no slide change, tray advance or defocussing of the lens can occur so that slide presentation can be continued without any problems when the projector has been reset to normal operation.

Switch-over of the projector to standby operation can of course also be effected such that the projector is brought into standby condition by a special standby command of the remote control device and then reset to normal operation by actuating any other command key of the remote control. The advantage of this version is that a special reset command is not required.

The remote control device is of course not limited to the IR remote control illustrated in the embodiment. The remote control can also operate in other wave length ranges and it may also be designed as a radio frequency remote control or an ultrasound remote control.

We claim:

1. A remote-controlled slide projector comprising a transformer, a rectifier, a projection lamp and a blower, characterized in that said slide projector includes remote control means for turning on and off the projection lamp or both the projection lamp and the blower via a switch controlled by an electronic control circuit wherein said projection lamp can be switched off by a specific command of the remote control means, and, as a result all other remote-controllable functions including slide change and focusing are blocked by the control circuit until the projection lamp is switched on again by another command.

2. Remote-controlled slide projector according to claim 1, characterized in that the projection lamp can be switched off by a specific command of the remote control means and switched back on again by actuating any other command key.

3. Remote-controlled slide projector according to claim 1, characterized in that a time delay circuit is provided by means of which the blower can be switched off only with a delay of several seconds after deenergization of the projection lamp.

4. Remote-controlled slide projector according to claim 1, characterized in that said remote control means includes a cable type remote control device or a cable-less remote control device.

5. Remote-controlled slide projector according to claim 4, characterized in that the cable-less remote control device preferably consists of an IR remote control system comprising an IR transmitter and an IR receiver.

6. Remote-controlled slide projector according to claim 1, characterized in that the switch for energizing-/deenergizing the projection lamp and the blower is a semiconductor switch.

7. Remote-controlled slide projector according to claim 3, characterized in that the control circuit includes a microprocessor by means of which all projector functions are controllable.

8. Remote-controlled slide projector according to claims 7, characterized in that the duration of the time delay for de-energizing the blower can be programmed by the microprocessor control unit.

* * * * *